(12) United States Patent
Yoon

(10) Patent No.: US 7,436,089 B2
(45) Date of Patent: Oct. 14, 2008

(54) RECIPROCATING MOTOR

(75) Inventor: Hyung-Pyo Yoon, Gyeongsangnam-Do (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 10/539,583

(22) PCT Filed: Oct. 15, 2003

(86) PCT No.: PCT/KR03/02143

§ 371 (c)(1),
(2), (4) Date: Dec. 5, 2005

(87) PCT Pub. No.: WO2005/039022

PCT Pub. Date: Apr. 28, 2005

(65) Prior Publication Data

US 2006/0145546 A1    Jul. 6, 2006

(51) Int. Cl.
*H02K 33/00* (2006.01)
*H02K 35/00* (2006.01)
(52) U.S. Cl. .................. 310/15; 310/254; 310/216
(58) Field of Classification Search .......... 310/15, 310/14, 254, 216
See application file for complete search history.

(56) References Cited
U.S. PATENT DOCUMENTS

| | | | |
|---|---|---|---|
| 2002/0105247 A1* | 8/2002 | Park | 310/254 |
| 2002/0105248 A1* | 8/2002 | Park | 310/254 |
| 2002/0135264 A1* | 9/2002 | Song et al. | 310/254 |
| 2003/0086796 A1* | 5/2003 | Park et al. | 417/360 |

FOREIGN PATENT DOCUMENTS

| | | |
|---|---|---|
| DE | 10160011 | 8/2002 |
| JP | 62-20324 U | 2/1987 |
| JP | 2002-247796 A | 8/2002 |
| KR | 20020068175 A | 8/2002 |
| KR | 20020081785 A | 10/2002 |
| WO | WO-02/087059 A1 | 10/2002 |

* cited by examiner

*Primary Examiner*—Darren Schuberg
*Assistant Examiner*—Alex W Mok
(74) *Attorney, Agent, or Firm*—Birch, Stewart, Kolasch & Birch, LLP

(57) ABSTRACT

A reciprocating motor comprising an outer stator (110) having a cylindrical shape by radially stacking a plurality of lamination sheets (112) at the outside of a bobbin (160) in which a winding coil is wound; an inner stator (120) disposed in the outer stator (110) at a certain air gap from an inner circumference of the outer stator, and having a cylindrical shape by radially stacking a plurality of lamination sheets (122); a magnet paddle (140) disposed between the outer stator and the inner stator, and having a plurality of magnets (130) installed at a circumference thereof; a terminal part (170) provided at one side of the outer stator, and having a magnetic force balancing part (80) at which lamination sheets are not stacked, provided at the outer stator at the same interval on the basis of the terminal part in a circumferential direction of the outer stator.

13 Claims, 8 Drawing Sheets

RECIPROCATING MOTOR

TECHNICAL FIELD

The present invention relates to a reciprocating motor, and particularly to a reciprocating motor capable of improving performance thereof by preventing frictions due to an eccentric motion during its operation.

BACKGROUND ART

A reciprocating motor has a plane form of magnetic flux compared to a general motor which has a steric structure of magnetic flux. In the reciprocating motor, a magnet paddle disposed between an outer stator and an inner stator is linearly moved according to variation of the magnetic flux.

As shown in FIGS. 1 and 2, a reciprocating motor according to the conventional art, includes an outer stator 10 having a cylindrical shape by radially stacking a plurality of lamination sheets 12 at an outside of a bobbin 60 in which a winding coil 50 is wound; an inner stator 20 having a cylindrical shape by radially stacking a plurality of lamination sheets 22, and disposed in an inner circumference of the outer stator 10 at a certain air gap from an inner circumferential surface of the outer stator 10; and a cylindrical magnet paddle 40 disposed between the outer stator 10 and the inner stator 20, and having a plurality of magnets 30 installed in a circumferential direction of thereof.

A terminal part 70 for applying an external power to the winding coil 50 inside the bobbin 60 is protruded at one side of the bobbin 60, and a plurality of lamination sheets 12 are uniformly stacked in the vicinity of the terminal part 70.

Operations of the conventional reciprocating motor constructed as above will now be described. When power is applied to a winding coil 50 of the outer stator 10, flux is formed around the winding coil 50. The flux flows to form a closed loop through the outer stator 10 and the inner stator 20. According to this, the magnet paddle 40 is pushed or pulled according to the direction of the flux, and thus is linearly and reciprocally moved.

In the conventional reciprocating motor as above, the terminal part 70 for connecting external power to the winding coil 50 is installed between the lamination sheets 12 of the outer stator 10, and the lamination sheets 12 are not stacked as much as the width of the terminal part 70. For this reason, an electromagnetic force generated in the vicinity of the terminal part 70 is relatively smaller than an electromagnetic force generated at the opposite side of the terminal part 70. Therefore, an electromagnetic field formed between the outer stator 10 and the inner stator 20 is not uniform, the electromagnetic field is eccentrically formed toward the opposite side of the terminal part 70.

By this eccentricity of the electromagnetic field, the magnet paddle 40 is moved toward the opposite side of the terminal part 70, that is, in an arrow direction in FIGS. 3 and 4. Therefore, the cylindrical magnet paddle 40 collides with the outer stator 10, and thus friction is caused by the eccentric motion of the magnet paddle 40.

DISCLOSURE OF THE INVENTION

Therefore, it is an object of the present invention to provide a reciprocating motor capable of preventing friction caused by an eccentric motion of a cylindrical magnet paddle reciprocating between an outer stator and an inner stator by making an electromagnetic field formed between the outer stator and the inner stator uniform.

To achieve the above object, there is provided a reciprocating motor comprising an outer stator having a cylindrical shape by radially stacking a plurality of lamination sheets at the outside of a bobbin in which a winding coil is wound; an inner stator disposed in the outer stator at a certain air gap from an inner circumference of the outer stator, and having a cylindrical shape by radially stacking a plurality of lamination sheets; a magnet paddle disposed between the outer stator and the inner stator, and having a plurality of magnets installed at a circumference thereof; a terminal part provided at one side of the outer stator for connecting an external power to the winding coil of the outer stator; and a magnetic force balancing part at which lamination sheets are not stacked, provided at the outer stator at the same interval on the basis of the terminal part in a circumferential direction of the outer stator.

The foregoing and other objects, features, aspects and advantages of the present invention will become more apparent from the following detailed description of the present invention when taken in conjunction with the accompanying drawings.

MODES FOR CARRYING OUT THE PREFERRED EMBODIMENTS

Hereinafter, preferred embodiments of the present invention according to the present invention will now be described with reference to accompanying drawings.

Figure 1:
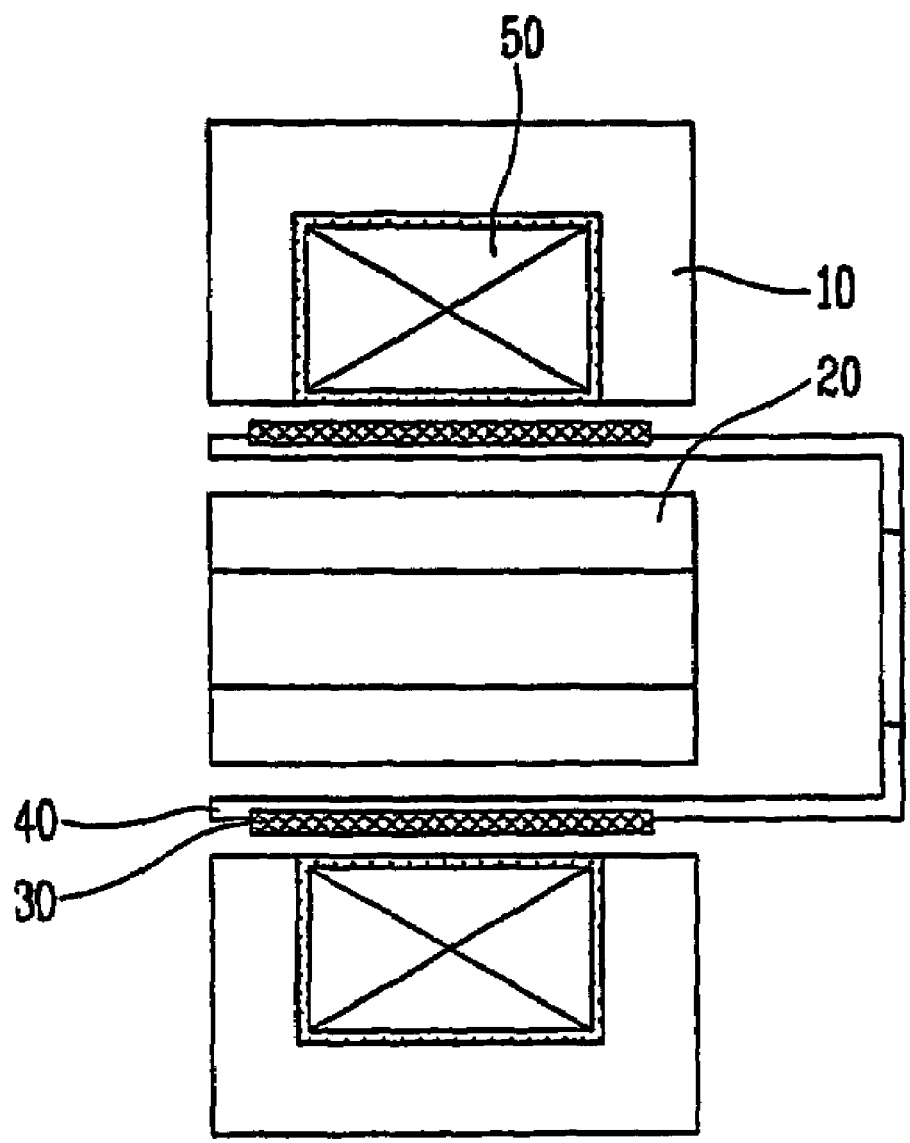
FIG. 1 is a sectional view showing a conventional reciprocating motor.
Figure 2:
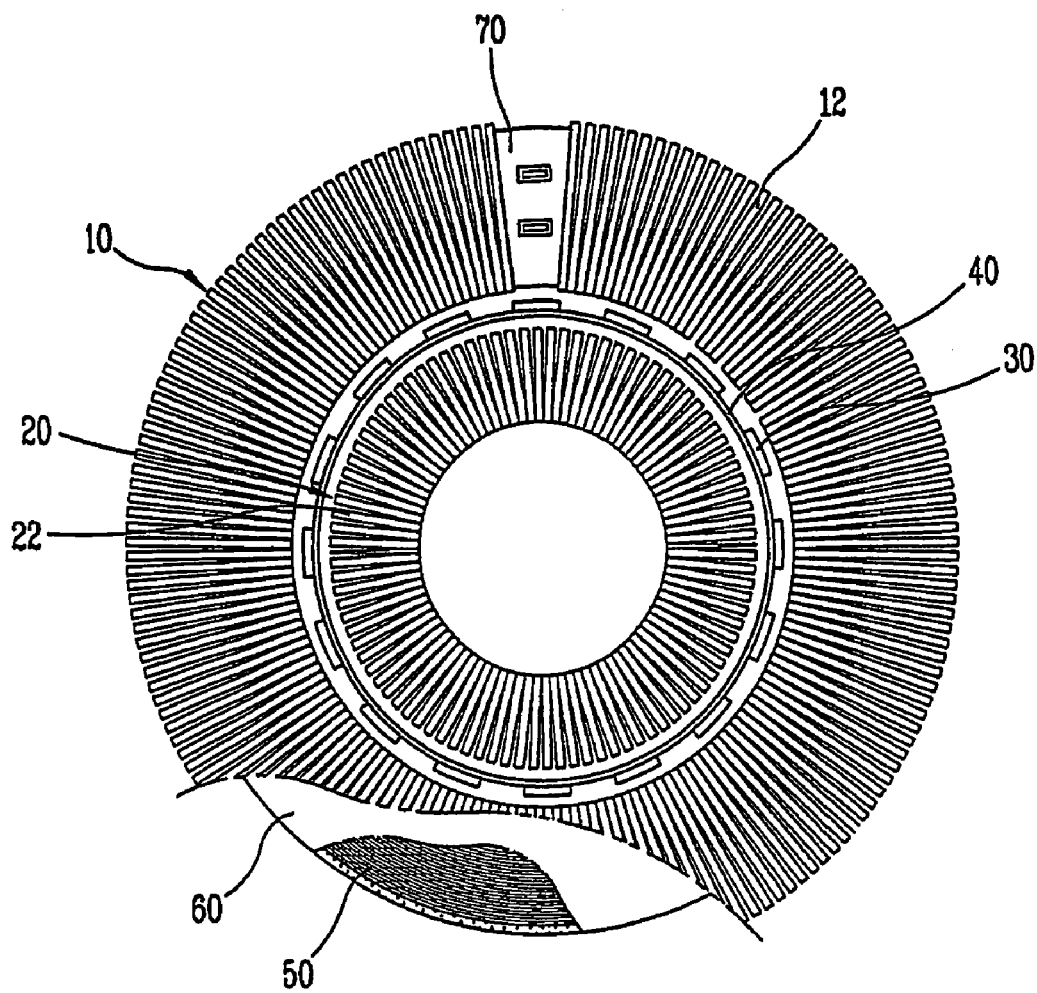
FIG. 2 is a front view showing a conventional reciprocating motor.
Figure 3:
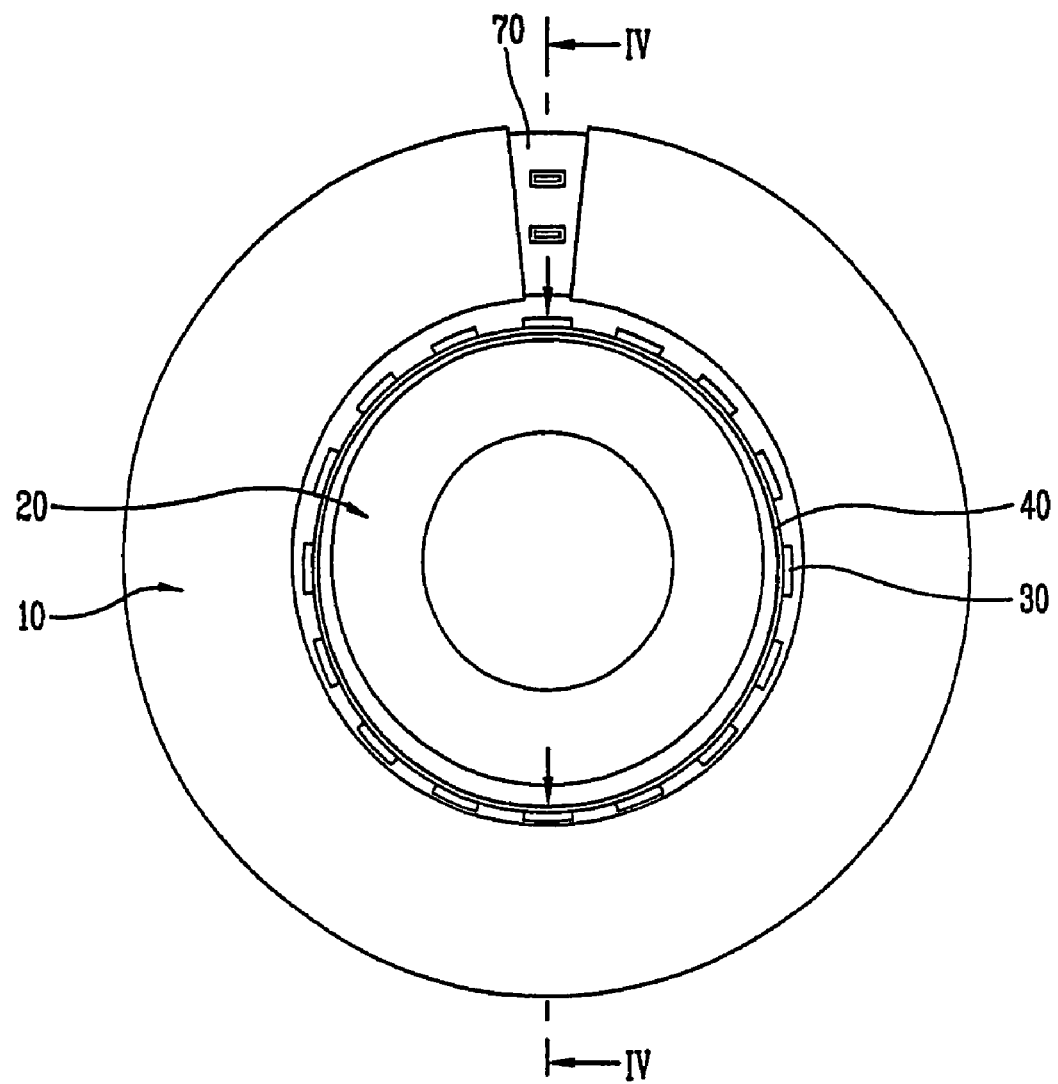
FIG. 3 is a schematic view showing an operation state of a conventional reciprocating motor.
Figure 4:
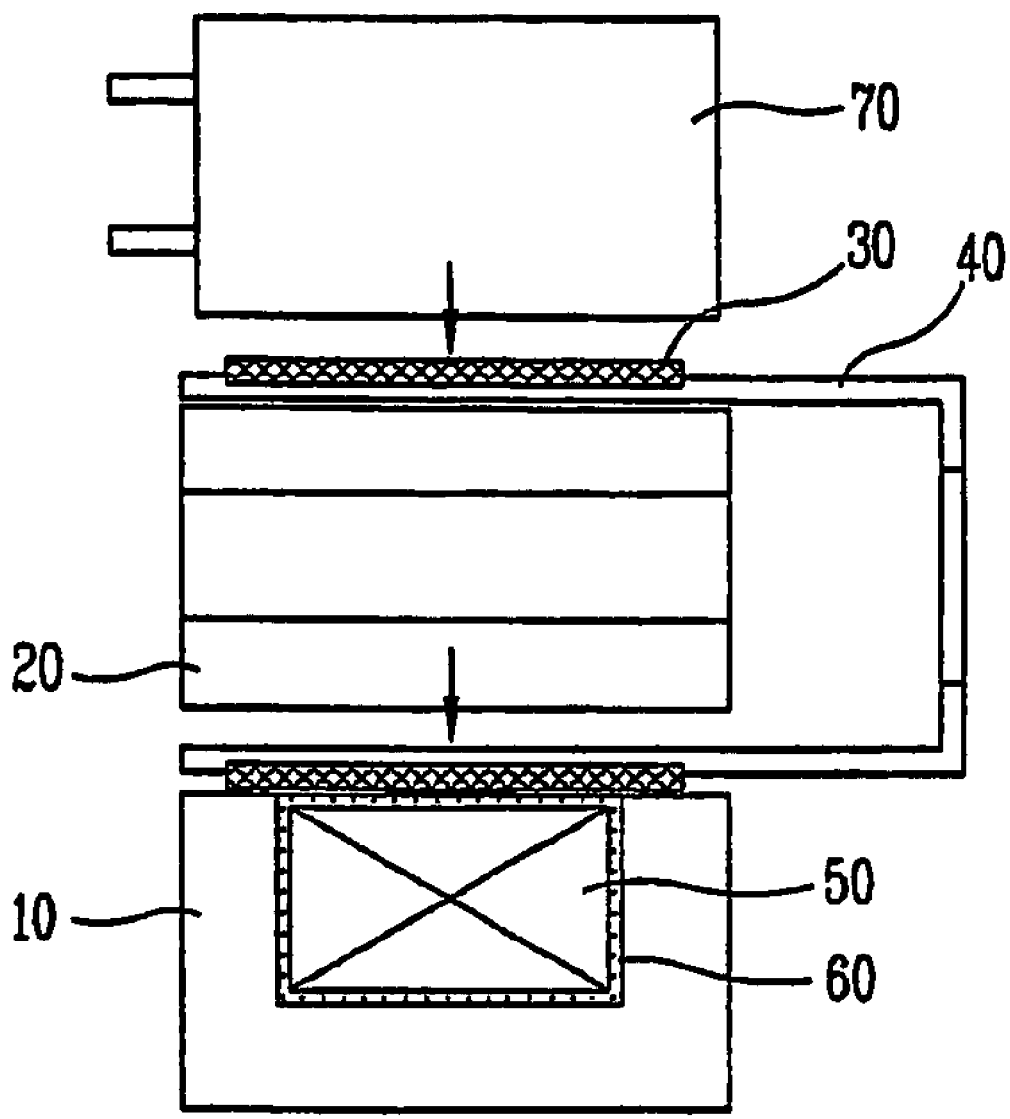
FIG. 4 is a sectional view taken along line IV-IV in FIG. 3.
Figure 5:
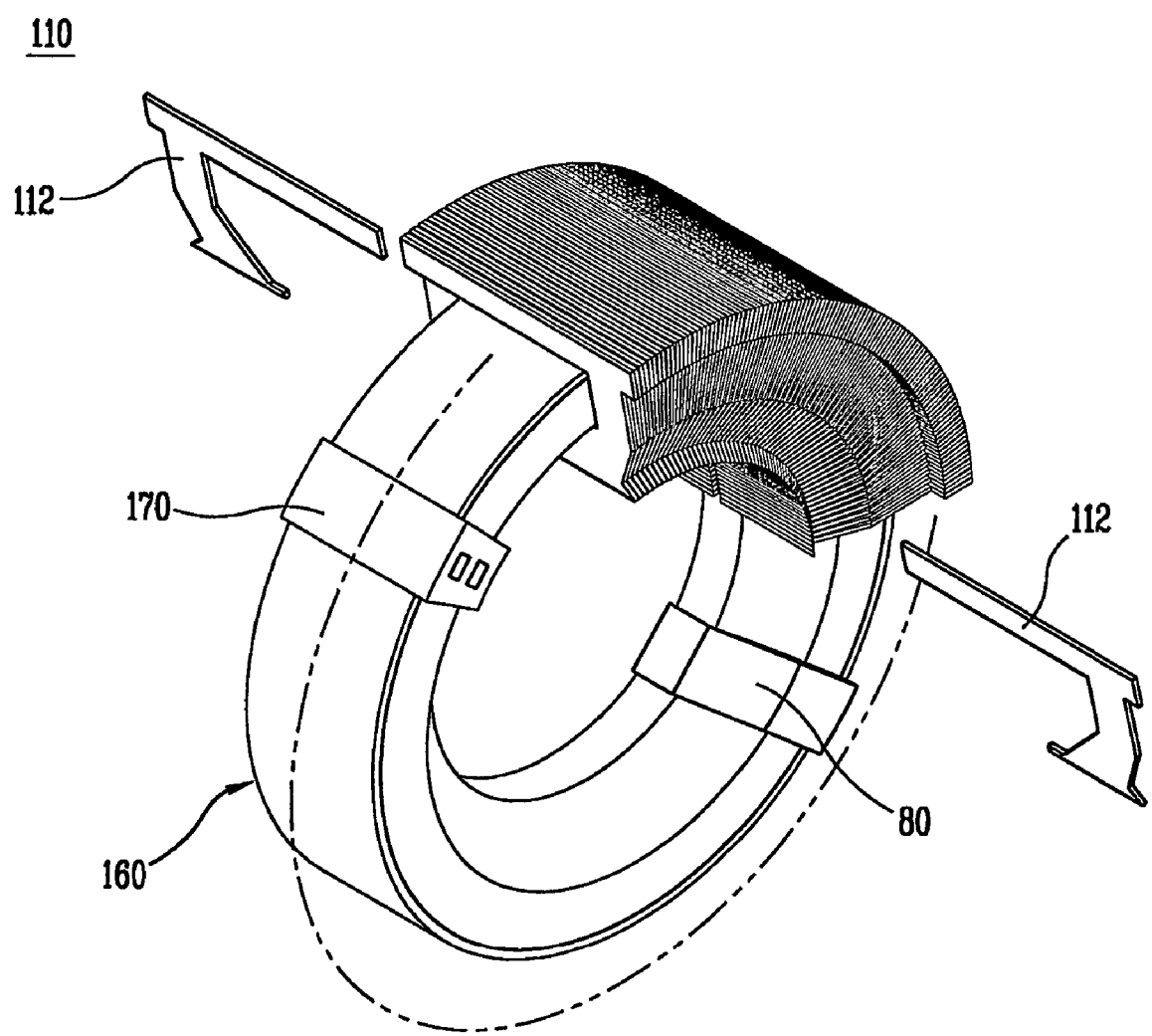
FIG. 5 is a perspective view showing a reciprocating motor according to a first embodiment of the present invention.
Figure 6:
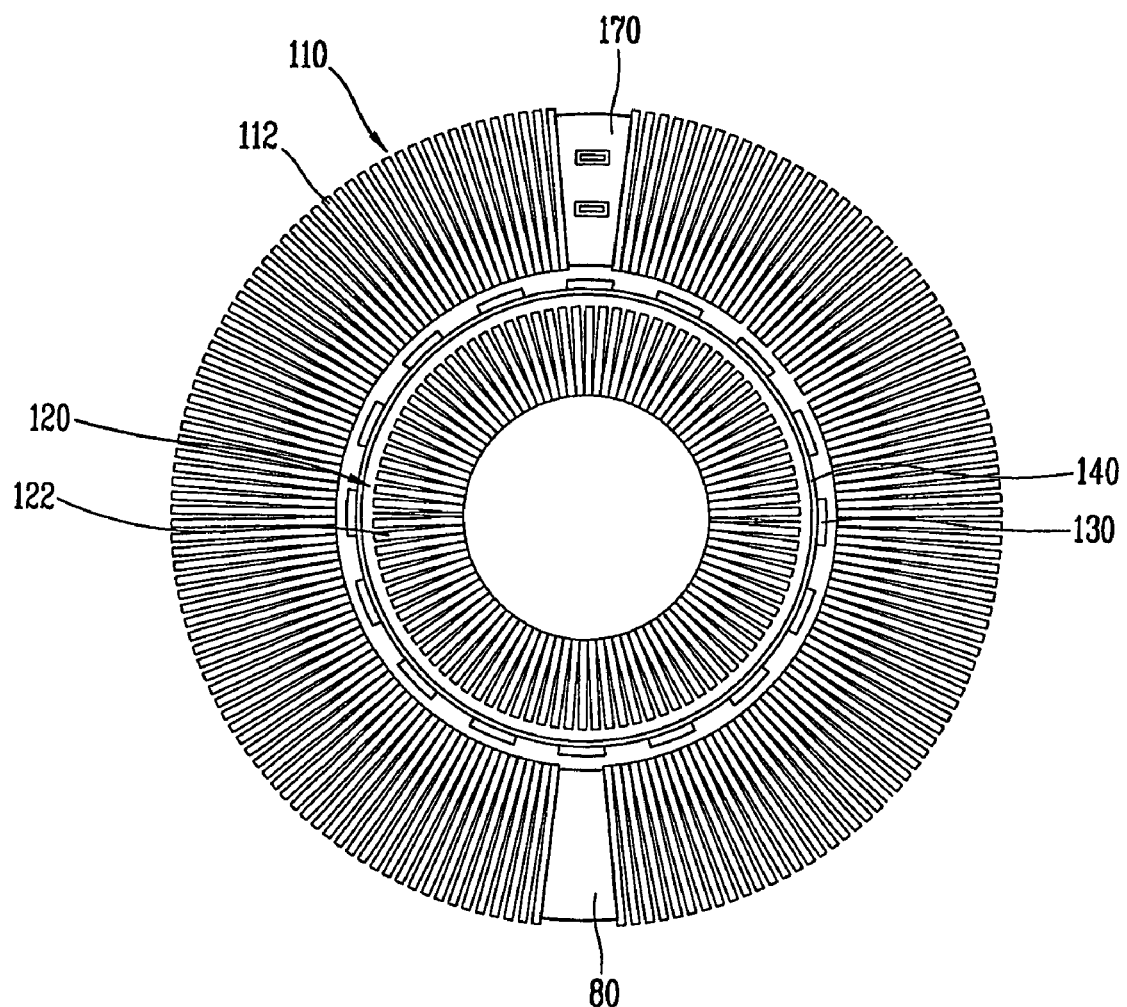
FIG. 6 is a front view showing a reciprocating motor according to a first embodiment of the present invention.

As shown in FIGS. 5 and 6, a reciprocating motor according to a first embodiment of the present invention comprises an outer stator 110 having a cylindrical shape by radially stacking a plurality of lamination sheets 112 at the outside of a bobbin 160 in which a winding coil is wound; an inner stator 120 disposed in the outer stator 110, and having a cylindrical shape by radially stacking a plurality of lamination sheets 122; and a cylindrical magnet paddle 140 disposed between the outer stator 110 and the inner stator 120, and having a plurality of magnets 130 installed in a circumferential direction.

A terminal part 170 for connecting the winding coil wound at the inside of the bobbin 160 and an external power is protruded at one side of the bobbin 160, and the plurality of laminations sheets 112 are uniformly stacked in the vicinity of the terminal part 170.

In addition, in order to prevent unbalance of an electromagnetic field formed between adjacencies of the position where the terminal part 170 is installed and the opposite side of the terminal part 170, a magnetic force balancing part 80 where lamination sheets 112 are not stacked, is installed at the opposite side of the terminal part 170, that is, at a position spaced apart from the terminal part 170 by 180 degrees on the basis of the terminal part 170 in a circumferential direction of the outer stator 110.

Figure 7:
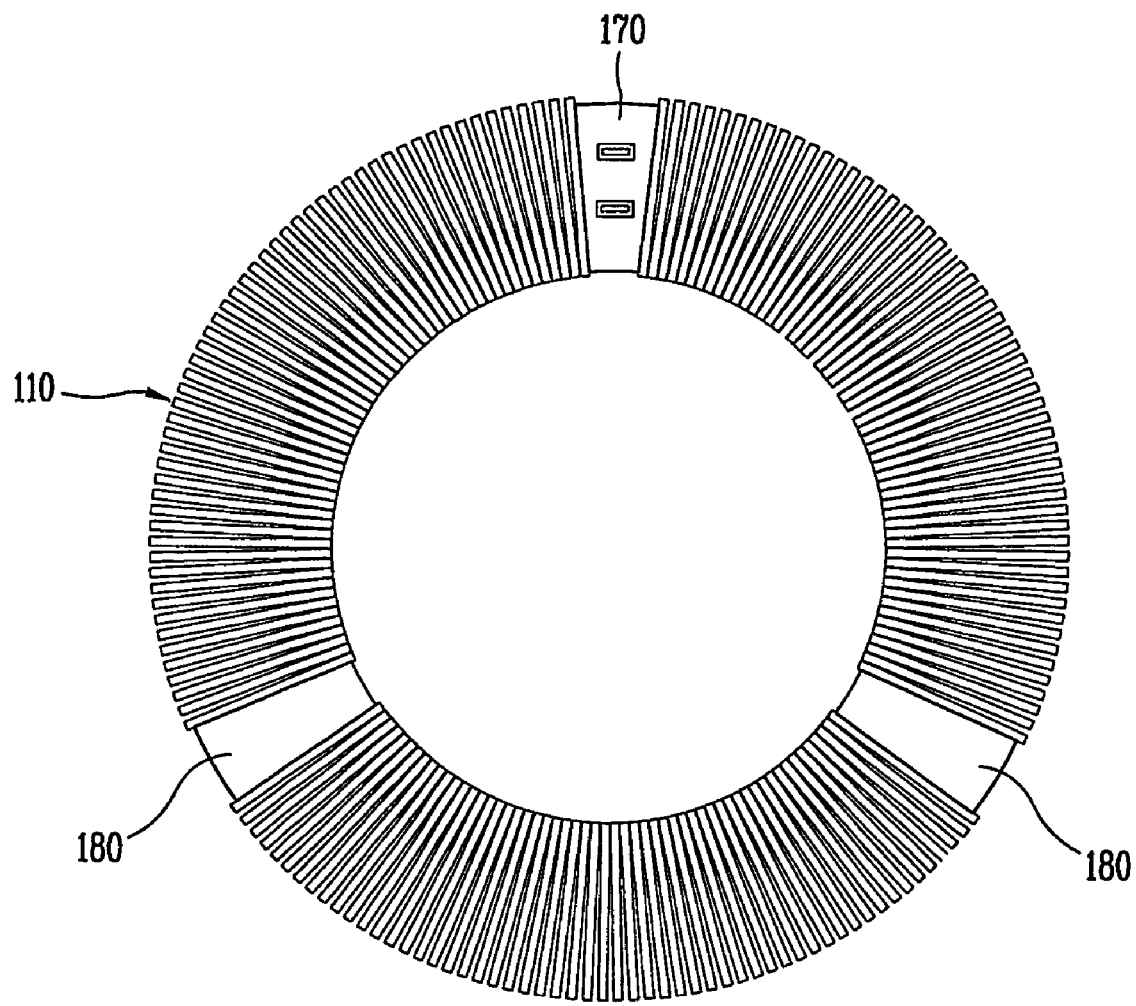
FIG. 7 is a front view showing an outer stator provided in a reciprocating motor according to a second embodiment of the present invention.
Figure 8:
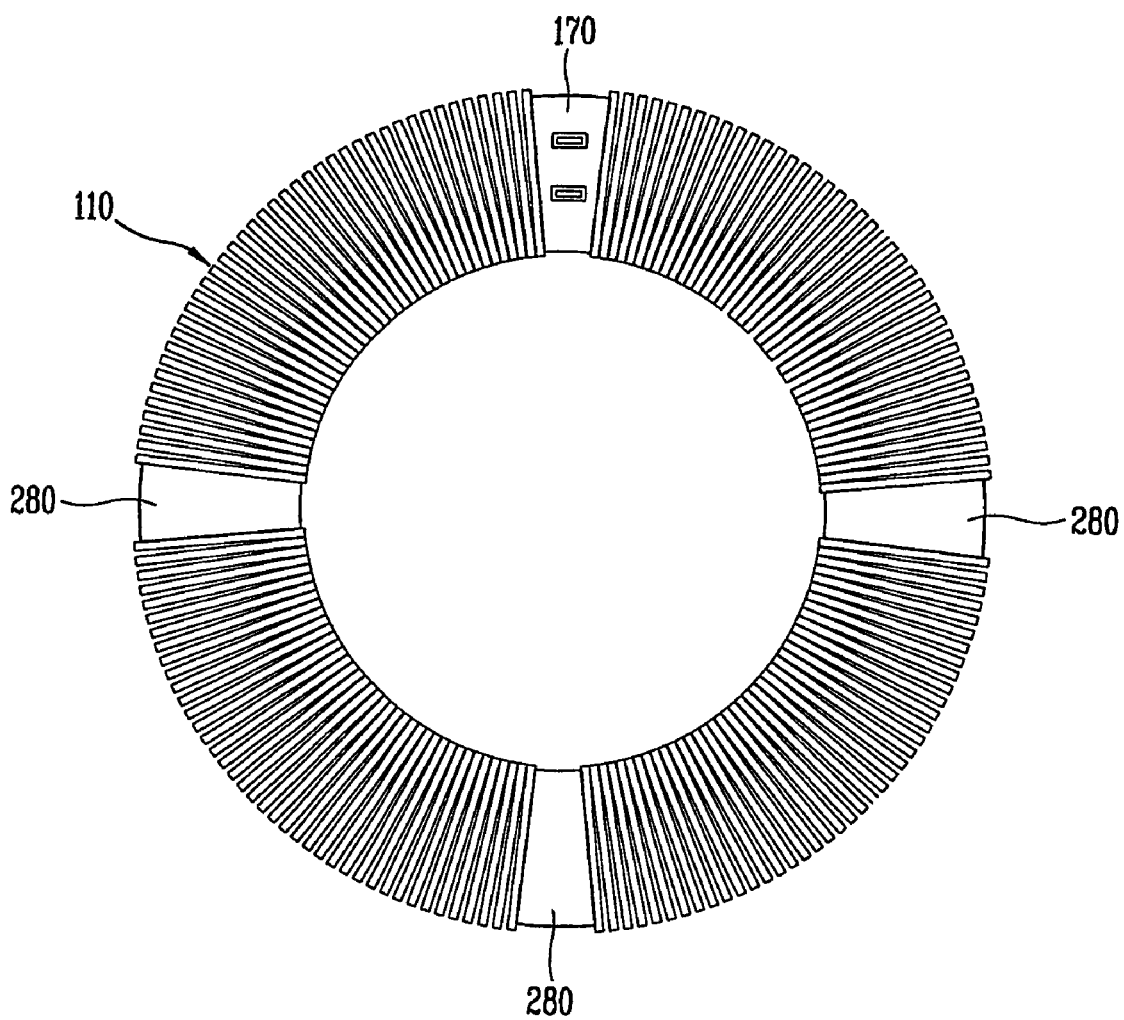
FIG. 8 is a front view showing an outer stator provided in a reciprocating motor according to a third embodiment of the present invention.

As shown in FIGS. 7 and 8, in a reciprocating motor according to a second and a third embodiments of the present invention, magnetic force balancing parts 180 and 280 where lamination sheets 112 are not laminated, can be respectively formed at intervals of 120 degrees and 90 degrees therebetween on the basis of the terminal part 170 in a circumferential direction of the outer stator 110. In addition, the plurality of magnetic force balancing parts may be formed at a smaller interval therebetween. Preferably, the interval is properly regulated according to performance of the reciprocating motor.

Herein, preferably, the magnetic force balancing part 80, 180 and 280 is formed so as to have the same shape or the same sectional area as the terminal part 170. Also, preferably, the magnetic force balancing parts 80, 180 and 280 are formed at the same interval therebetween respectively, and are integrally formed with the bobbin 160.

Operations and effect of the reciprocating motor according to the present invention constructed as above will now be described.

Firstly, when an external power is applied and a current flows to the winding coil, a flux is formed around the winding coil. The flux forms a closed loop along the outer stator 110 and the inner stator 120. According to the interaction between the flux formed at the outer stator 110 and the inner stator 120 and the magnetic flux formed by the magnet 130, the magnet paddle 140 receives a force in the axial direction and is linearly moved between the outer stator 110 and the inner stator 120. When the direction of the current flowing into the winding coil is changed, the direction of the flux formed at the outer stator 110 and the inner stator 120 is also changed, and thus the cylindrical magnet paddle 140 is moved in an opposite direction.

At this time, since the terminal part 170 and the magnetic force balancing part 80, 180 and 280 at which lamination sheets are not laminated are disposed at the same interval therebetween, the magnetic field generated between the outer stator 110 and the inner stator 120 is uniformly formed.

Accordingly, the cylindrical magnet paddle 140 linearly and reciprocally moved between the outer stator 110 and the inner stator 120 is not eccentric and thus can be reciprocally and constantly moved.

The reciprocating motor according to the present invention can improve the performance thereof by preventing friction due to the eccentric motion of the cylindrical magnet paddle reciprocating between the outer stator and the inner stator, by forming the terminal part and the magnetic force balancing part at which lamination sheets are not stacked, at the same interval therebetween.

It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A reciprocating motor comprising:
    an outer stator having a plurality of radially stacked first lamination sheets around a bobbin in which a winding coil is wound, each of the first lamination sheets being radial with respect to the center of the bobbin;
    an inner stator disposed in the outer stator at a certain air gap from an inner circumference of the outer stator, and having a plurality of radially stacked second lamination sheets;
    a magnet paddle disposed between the outer stator and the inner stator, and having a plurality of magnets installed at a circumference thereof;
    a terminal part provided at one side of the outer stator for connecting an external power to the winding coil of the outer stator; and
    a magnetic force balancing part at which the first lamination sheets are not stacked, provided at the outer stator at the same interval on the basis of the terminal part in a circumferential direction of the outer stator.

2. The motor of claim 1, wherein the magnetic force balancing part has the same shape as the terminal part.

3. The motor of clam 1, wherein the magnetic force balancing part has the same sectional area as the terminal part.

4. The motor of claim 1, wherein The magnetic force balancing part is integrally formed with the bobbin.

5. The motor of claim 1, wherein the magnetic force balancing part is disposed at an interval of 180 degrees on the basis of the terminal part in a circumferential direction of the outer stator.

6. The motor of claim 1, wherein the plurality of the magnetic force balancing parts are disposed at the same intervals on the basis of the terminal part in a circumferential direction of the outer stator.

7. The motor of claim 6, wherein the magnetic force balancing parts are disposed at an interval of 120 degrees therebetween on the basis of the terminal part in a circumferential, direction of the outer stator.

8. The motor of claim 6, wherein the magnetic force balancing parts are disposed at an interval of 90 degrees therebetween on the basis of the terminal part in a circumferential direction of the outer stator.

9. The motor of claim 1, wherein the magnetic force balancing part occupies a partial portion of an inner circumference of the bobbin such that the first lamination sheets of the outer stator are disconnected to form a gap at the partial portion of the inner circumference of the bobbin occupied by the magnetic force balancing part.

10. The motor of claim 1, wherein the first lamination sheets of the outer stator are divided into at least a first group and a second group, a first end of the first group being spaced apart from a first end of the second group by a first gap at a first partial portion of an inner circumference of the bobbin occupied by the magnetic force balancing part.

11. The motor of claim 10, wherein a second end of the first group being spaced apart from a second end of the second group by a second gap at a second partial portion of the inner circumference of the bobbin occupied by the terminal part, the first lamination sheet at the first end of the first group being aligned with the first lamination sheet at the second end of the second group along a diametric direction of the outer stator.

12. The motor of claim 1, wherein the magnetic force balancing part surrounds a partial portion of the bobbin and covers a partial portion of an inner circumference of the bobbin.

13. The motor of claim 1, wherein the magnetic force balancing part is protruded at an outer side of the bobbin.

* * * * *